United States Patent [19]
Panzer et al.

[11] 3,894,948
[45] July 15, 1975

[54] PROCESS FOR TREATING SEWAGE SLUDGE

[75] Inventors: Hans Peter Panzer, Stamford, Conn.; Kenneth Wayne Dixon, Ypsilanti, Mich.

[73] Assignee: American Cyanamid Company, Stamford, Conn.

[22] Filed: Feb. 25, 1974

[21] Appl. No.: 445,177

Related U.S. Application Data

[60] Continuation-in-part of Ser. No. 347,247, April 2, 1973, abandoned, which is a division of Ser. No. 233,622, Feb. 4, 1972, Pat. No. 3,738,945, which is a continuation-in-part of Ser. No. 115,556, Feb. 16, 1971, abandoned.

[52] U.S. Cl. ............................................. 210/54
[51] Int. Cl.² ........................................... C02B 1/20
[58] Field of Search ............... 210/10, 47, 52–54; 260/89.7 N

[56] References Cited
UNITED STATES PATENTS

| | | |
|---|---|---|
| 2,173,069 | 9/1939 | Ulrich et al. ........................ 260/247 |
| 2,753,372 | 7/1956 | Lundburg ............................ 260/501 |
| 3,131,144 | 4/1964 | Nagan ................................. 210/54 |
| 3,240,721 | 3/1966 | Fordyce .............................. 260/2 |
| 3,259,570 | 7/1966 | Priesing et al. ...................... 210/53 |
| 3,493,502 | 2/1970 | Coscia ................................ 210/54 |
| 3,567,659 | 3/1971 | Nagy .................................. 260/2 |

FOREIGN PATENTS OR APPLICATIONS 1,111,144  7/1961  Germany

*Primary Examiner*—Thomas G. Wyse
*Attorney, Agent, or Firm*—William J. van Loo

[57] ABSTRACT

Treating of sewage sludges with effective amounts of polyquaternary polymers obtained by interaction of a secondary amine, a difunctional epoxy compound, and a polyfunctional amine provide improved processing of the sludges when the solution viscosity of the polyquaternary polymer is at least 800 centistokes when measured at 25°C. at a concentration of 37%, by weight, based on the cationic portion of the polyquaternary polymer.

7 Claims, 2 Drawing Figures

PROCESS FOR TREATING SEWAGE SLUDGE

This is a continuation-in-part of application Ser. No. 347,247, filed Apr. 2, 1973, now abandoned; which is a division of application Ser. No. 233,622, filed Feb. 4, 1972, now U.S. Pat. No. 3,738,945, issued June 12, 1973; which is a continuation-in-part of application Ser. No. 115,556, filed Feb. 16, 1971, now abandoned.

This invention relates to a process for treating sewage sludges. More particularly, the invention relates to such a process wherein a polyquaternary flocculant derived from the reaction of an epoxy compound with a major amount of a secondary amine and a minor amount of a polyfunctional amine is employed.

In general sewage treatment encompasses the processes wherein the liquid and the solid portions of sewage are separated. The liquid effluent from the primary thickening operation may be further treated biologically, prior to ultimate disposal by dilution in a receiving stream.

The solid portion, or sludge, is made up of suspended solids that have been removed from or formed from the incoming sewage. The sewage treatment plant is designed to remove suspended solids as much as feasible, and, in many cases, convert the majority of the remaining organic matter, through oxidation, into stable solids.

The disposal of the sludge formed in processing is a problem encountered by all plants. It may be disposed of by a number of methods including lagooning, incinerating, land filling, dumping or by use as a fertilizer. Normally, it is beneficial to concentrate or thicken the sludges as much as possible to facilitate disposal.

This invention is intended for use in operations commonly used in the treatment of sewage sludges.

These include such processes as sludge dewatering, secondary clarification, elutriation, tertiary treatment, thickening of sludges such as digested primary, mixed raw and activated, mixed digested raw and activated, activated, and various sludges arising from tertiary treatment either alone or in combination with other sludges. Sludge dewatering may be conducted by mechanical means such as vacuum filters, filter presses, centrifuges or by the use of drying beds. Sludge thickening is usually conducted in large holding tanks or through dissolved air flotation.

In the treatments associated with sewage sludge, there continues to exist the need for more efficient agents that minimize the problems arising from use of conventional agents. Provision of such agents would fulfill a long-felt need in the art.

In accordance with the present invention, there is provided a method of treatment of sewage sludge which comprises adding to said sludge an effective amount of a water-dispersible polyquaternary polymer consisting essentially of the reaction product of a lower dialkylamine, a polyfunctional amine, and a difunctional epoxy compound selected from the group consisting of epihalohydrins, diepoxides, precursors of epihalohydrins and diepoxides which under alkaline conditions are readily converted into the corresponding epoxy compounds, and mixtures thereof, said polyquaternary polymer containing repeated units of the structures

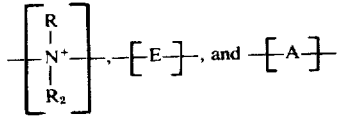

as the cationic portion, and X— as the anionic portion wherein R and $R_2$ are individually selected from the group consisting of alkyls of 1 to 3 carbon atoms; E is a residue obtained from said epoxy compound; A is a residue obtained after at least bifunctional epoxy reaction from a polyfunctional amine selected from the group consisting of ammonia; primary amines; alkylene diamines of 2 to 6 carbon atoms; polyalkylenepolyamines of the structure

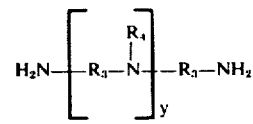

wherein $y$ represents an integer of about 1 to 5, $R_3$ is an alkylene radical of about 2 to 6 carbon atoms, and $R_4$ is selected from the group consisting of hydrogen, alkyl of about 1 to 3 carbon atoms, and ω-aminoalkyl of about 2 to 6 carbon atoms; a polyglycolamine of a structure such as:

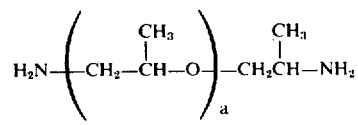

wherein $a$ is an integer of about 1 to 5; piperazine; heteroaromatic diamines of the structure

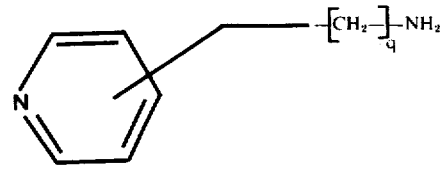

wherein $q$ is zero or an integer of about 1 to 3; and aromatic diamines of the structure

wherein $p$ and $q$ are individually zero or an integer of about 1 to 3; X— is an anion forming the anionic portion of said polyquaternary compound; the amount of said polyfunctional amine being up to about 15 mole percent of the total moles of said dialkylamine and said polyfunctional amine, the amount of said E is from at least that amount which is equimolar to the molar quantities of said amines up to the full functional equivalency of said amines, so as to provide a polyquaternary compound which is a 37% aqueous solution based on the cationic portion of said polyquaternary compound has a viscosity at 25°C. of at least 800 centistokes; and the amount of said ion present is such as to satisfy anion requirements of the cationic portion of said polyquaternary compound; and thereafter removing water from said sludge.

In preferred embodiments, the process involves conditioning activated sludges, digested sludges, and flotation sludges wherein improvements in dewatering, separation, and underflow volumes are effected.

The polymeric flocculants of the present invention have high solution viscosities at specified aqueous concentrations. Solution viscosities of the polymeric flocculants reflect their molecular weight and, accordingly, polymeric flocculants used in the process of the present invention are of increased molecular weight. Since the flocculants are quaternary in nature, they possess a high degree of cationicity associated with their high molecular weight. As a result, they are outstanding in performance as flocculants in many applications and have a widely diversified range of utility.

Polyquaternary flocculants used in the process of the present invention are prepared by interaction of a difunctional epoxy type reactant with a major amount of a secondary amine and a minor amount of a polyfunctional amine, as has been indicated. In order to obtain polyquaternary flocculants of the necessary solution viscosities, i.e. from 800 to 17,000 centistokes, it is necessary to employ the reactants in specific ratio and to advance the reaction in the manner to be indicated.

The first reactant type considered is that designated as the epoxy type reactant. Epihalohydrins are used and are intended to include epichlorohydrin and epibromohydrin, for example. Longer chain epihalohydrins may also be used. Epichlorohydrin is preferred both from economic and reactivity aspects. Diepoxides, such as 1,4-butandiol-diglycidyl ether, a preferred diepoxide, are also useful. It is to be noted that epihalohydrins and diepoxides are bifunctional in reaction and this permits formation of essentially linear polymers in appropriate instances. Precursors for epihalohydrins and diepoxides are also useful. For example, 1,3-dichloropropanol-2, a precursor for epichlorohydrin, may be used. Similarly, 1,4-dichloro-2,3-dihydroxy-butane, the precursor for 1,3-butanediepoxide, may also be used. These precursors are readily converted into corresponding epoxy compounds under alkaline conditions and thus are generally employed under alkaline conditions in the present preparations. Mixtures of the various epoxy type reactants may also be employed. In forming the principal polymer chain, the amount of epoxy type compound should be substantially equimolar in amount to the total molar amount of amine usage, via the secondary amine and the polyfunctional amine. If this condition is not met, that is, the epoxy type reactant is less in amount, the polyamine will cause chain termination, thus resulting in significantly lower solution viscosities of the polyquaternary flocculants prepared. Controlled addition of reactants in forming the reaction mixture can also be employed as means of influencing formation of the principal polymer chain. In preferred instances, subsequent to reaction of equimolar amounts of total amine and epoxy type reactant, additional increments of epoxy type reactant are added to react with unreacted functionalities of the polyamines, providing acceptable branching and additional quaternarization, as well as cross-linking of separate molecular chains. If the epoxy type reactant is held below the minimum specified hereinabove, the reaction is terminated much sooner than is desired. The choice of relative amounts of epoxy type reactant and total amine contemplated by the preparative method used to prepare useful polymers of the present invention leads to the formation of high molecular weight linear chains in the polymer backbone, with the desired branch or cross-linking sites. Additional reaction with epoxy type compound of unreacted amine functionalities also tends to diminish susceptibility of the polyquaternary compound to chlorine attack where such possibility exists. In this respect, therefore, it is to be understood that usage of epoxy type compound can be up to the full equivalency of the amine reactants present, which can be much higher than equal molar quantity.

Secondary amines useful in preparing the desired polyquaternary flocculants include dimethylamine, preferred, diethylamine, dipropylamines, and secondary amines containing mixtures of alkyl groups containing 1 to 3 carbon atoms. Secondary amines of higher carbon contents are generally sluggish in reaction due to steric effects of the substituents present therein. Thus, such amines not only require unduly long reaction times but may also interfere with quaternary formation. Mixtures of the amines recited above may also be employed. It is to be noted that secondary amines are bifunctional in reaction with the bifunctional epoxy type reactants, a first function provided by the hydrogen atom and a second function involving quaternarization of the nitrogen atom. The secondary amine provides linear growth only in the polymer being prepared and does so with a quaternary group for each secondary amine involved in polymer growth.

Use of polyamines in preparing the polyquaternary compounds should constitute at least about 1% but not more than about 15% of the total molar amount of amines in the reaction and more usually about 2 to 8% of the molar amount. Higher amounts lead to excessive chain branching and can adversely effect performance and solubility of the products. The specific content of polyamine that may be used will vary in individual instances depending primarily upon the total functionality of the polyamine considered. Thus, polyamines of very high functionality can generally only be used in smaller amount within the general range specified. For example, a diamine having a functionality of 6 or more with respect to the epoxy type reactant cannot be used in amount greater than about 8% on a molar basis, based on the total molar amount of amines employed, whereas with a functionality of polyamine of less than 6, the amount thereof is greater than about 8 mole percent of the total amine. The upper limit of usage of a polyamine is that amount which still provides a water-soluble product. Referring to ethylenediamine, for example, it should be noted that this amine is hexafunctional with respect to reaction with epoxy type compound, four functionalities provided by the two hydrogen atoms present on each amine group and two additional functionalities involving quaternarization of each of the two nitrogen atoms. Not all of these functionalities are of equal reactivity and, consequently possibilities for control of the reaction to some extent between chain formation, chain branching, and quaternarization are provided. Amounts of polyamine below about 1 mole percent based on the total molar amount of amines employed generally do not have any significant effect on the properties of the polyquaternary compound and it is generally preferred to have at least 2 mole percent present, same basis.

Ammonia is polyfunctional in its reaction with an epoxy type reactant and may be employed as an equivalent to a polyamine. Primary amines are also useful and include a wide variety of aliphatic and aromatic species. The only requirements as to use of primary amine are that it possess sufficient reactivity with the epoxy type compound to exhibit polyfunctional reaction and that its use not result in water-insolubility of the polyquaternary. Preferred primary amines are lower alkyl amines wherein the alkyl groups contain up to about 3 carbon atoms.

Polyamines which may be employed include alkylene-diamines of about 2 to about 6 carbon atoms such as ethylenediamine, propylenediamine, and hexamethylenediamine. Oligoers of alkylene diamines are obtained from still bottoms resulting from the purification of certain alkylenediamines for other industrial purposes, for example in the purification of hexamethylenediamine used extensively for producing various nylons. The still bottoms, although not readily characterized as to exact composition give excellent results in preferred embodiments of the present invention and, since they are by-products, are quite economical. Polyalkylenepolyamines are also useful in the present process and include such compounds as diethylenetriamine, dipropylenetriamine, triethylenetetramine, pentaethylenehexamine, nitrilotris (propylamine), propylenediamine, N-methyl, N-propylamine, nitrilotris (ethylamine) and generally any compound of the following structure:

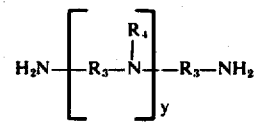

wherein $y$ represents an integer of about 1 to 5, $R_3$ is an alkylene group of about 2 to 6 carbon atoms, and $R_4$ is selected from the group consisting of hydrogen, alkyl of about 1 to 3 carbon atoms, and $\omega$-aminoalkyls of about 2 to 6 carbon atoms. In addition, other useful polyamines include polyglycolamines of a structure such as:

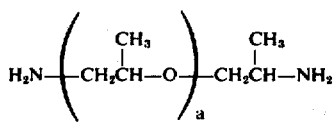

wherein $a$ is an integer of about 1 to 5, hetrocyclic aliphatic diamines such as piperazine, heteroaromatic diamines, of the structure:

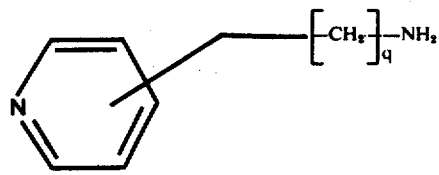

wherein $q$ is zero or an integer of about 1 to 3, and aromatic diamines of the structure:

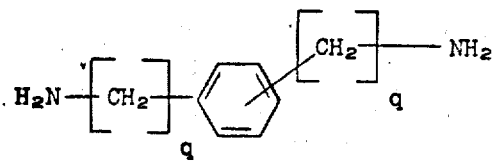

wherein $p$ and $q$ are individually zero or an integer of about 1 to 3.

Polyamine-polybasic acid condensation products are obtained by condensing a polyfunctional amine with a polyfunctional acid using a slight excess of amine so as to provide an amine-terminated product. Such condensates are widely known, as are their preparative methods. Typically, one would condense an amine such as triethylenetetramine with an acid such as adipic acid using a slight excess of amine over an equimolar change of reactants. The product obtained has the structure:

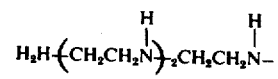

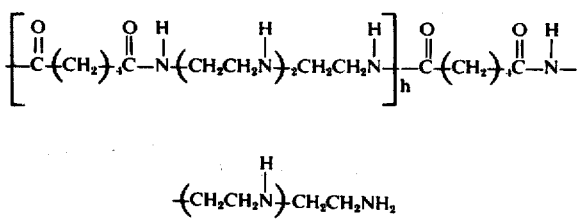

wherein $n$ is an integer such as to indicate a polymer of a molecular weight up to about 10,000. Although the polymer contains amide linkages, it is terminated with amine groups and has additional amine functionality depending upon the number of amine groups in the polyamine employed. Although the condensation product is typified by triethylenetetramine and adipic acid, it is to be understood that other polyamines and polybasic acids, as is well known may be employed in preparing the condensate.

In preparing a polyquaternary flocculant of the present invention, water is used as a reaction medium and is essential in the reaction. Generally, the amount of water will be in the range of about 10 to about 55%, by weight, based on the total weight of reactants and water. Absence of water presents problems in controlling the reaction and some water is necessary to effect reaction. The amount of water also influences the degree of polymerization effected, as reflected in solution viscosity of the resulting polyquaternary compound, lower amounts of water resulting in polyquaternary compounds of higher solution viscosities at equal solids of the cationic portion of the polyquaternary compound. Thus, the ultimate degree of polymerization obtained in a given preparation will be influenced by the amount of water present in the reaction mixture, and for products of high solution viscosities in water at 37% solids, by weight, based on the total weight of the cationic portiono of the polyquaternary, it is essential that the amount of water present in the reaction be limited, as indicated, to avoid premature termination of the growing polymer chain by cyclization and hydrolysis occasioned by excessive water usage. In preferred instances, the amount of water present will be in the range of about 15 to 45%, by weight, based on the total weight of reactants and water. In addition to water as the reaction medium, there may be used a water soluble alcohol in place of part of the water contemplated. It is generally preferred to use water alone, however, from an economic viewpoint.

There are, in general, two preferred variations by which the desired polyquaternary flocculants may be obtained. In one variation, the secondary amine and epoxy type reactant are first reacted to a substantial degree, i.e. from about 50 to about 80% of the reaction potential, in aqueous medium. In forming the reaction mixture, reactants may be added in either order and the temperature is maintained in the range of about 20°–100°C., preferably 20°–70°C. After the desired degree of reaction has been obtained, the polyamine is added and the reaction maintained in the range of about 50°–100°C. until a polyquaternary compound is obtained which has a 37% aqueous solution, by weight, based on the weight of the cationic portion of the polyquaternary compound, has a viscosity at 25°C. of at least 800 centistokes.

In the second variation, the secondary amine and polyamine are mixed and reacted with the epoxy type reactant in aqueous medium. Addition of reactants may be in any order and in preparing the reaction mixture, the temperature is maintained in the range of 20°–100°C. After the mixture is formed, it is held at a temperature in the range of 50°–100°C. until a viscosity as in the first variation is obtained.

In either of the two variations just described, the total usage of epoxy type reactant may be added during preparation of the reaction mixture. A preferred procedure, however, is to add an amount of epoxy type reactant which is about equimolar to the total amount of amines employed in preparing the reaction mixture and subsequently adding additional epoxy type reactant in increments up to the level of usage contemplated. In this method of addition, each increment of epoxy type reactant is allowed to react prior to addition of further increments. This method of addition allows very high viscosities to be achieved in a relatively safe manner.

There is essentially no upper limit on solution viscosity except that the polyquaternaries must be water dispersible and preferably water soluble to an extent useful in applications without unduly high viscosity. Products having viscosities in the range of 800 to 17,000 are generally preferred.

The amount of a particular polyquaternary compound that is to be used depends upon the nature of the sludge to be processed and the particular manner of processing contemplated. It can be readily appreciated that sludge compositions will vary considerably and that no single sample taken can be considered representative of composition in general. Effective usages may be as low as a few parts per million parts of sludge to as high as several percent by weight of the sludge. Generally, treatment is carried out with a preselected usage level of polyquaternary compound and adjustments made to compensate for variations in sludge composition and effective treatment as required. Thus, treatment is generally by continuous processing and adjustments in polyquaternary usage are constantly necessary due to changing sludge composition.

Treatment of the sludge with polyquaternary compound may be carried out in any convenient manner. Generally, the polymer is diluted prior to addition to the sludge so as to reduce its viscosity and to enable uniform mixing in the sludge to be accomplished more effectively. It may be added to the sludge directly or to dilution water to be added in the processing contemplated. It is beneficial to add the polyquaternary at the point in processing where its addition provides the improved results desired.

In carrying out the process of the present invention, sewage sludges are treated providing flocculation and thus facilitating settling, thickening, flotation and dewatering.

In secondary clarification, the effluent from the secondary or biological treatment is treated with the invention to speed up settling, and improve capture in order to prevent suspended solids carry over into plant effluent.

In tertiary treatment, the invention is used to improve capture and to facilitate filtration by sand, carbon or similar type media.

Primary and digested secondary sludges or combinations of the two are commonly thickened by either sedimentation or air flotation. The invention is used to improve the rate of settling or flotation, increase compaction, and increase capture in such operations.

Where elutriation is used, the application of this invention reduces the recirculation of fines in the system and produces a more compact or higher solids sludge which facilitates further dewatering operations.

Dewatering is generally handled by vacuum filters, centrifuges, filter presses and drying beds. In the case of vacuum or pressure filtration, the application of the invention will condition the sludge so as to increase production, give a drier cake and a cleaner filtrate. Similarly, in centrifugation, one obtains better capture and a clearer centrate. In drying beds, the speed of drying is accelerated substantially.

Sludges from these dewatering processes may be ultimately disposed of by incineration or used as land fill, fertilizer, or ocean barging.

In accompanying drawings.

Figure 1:
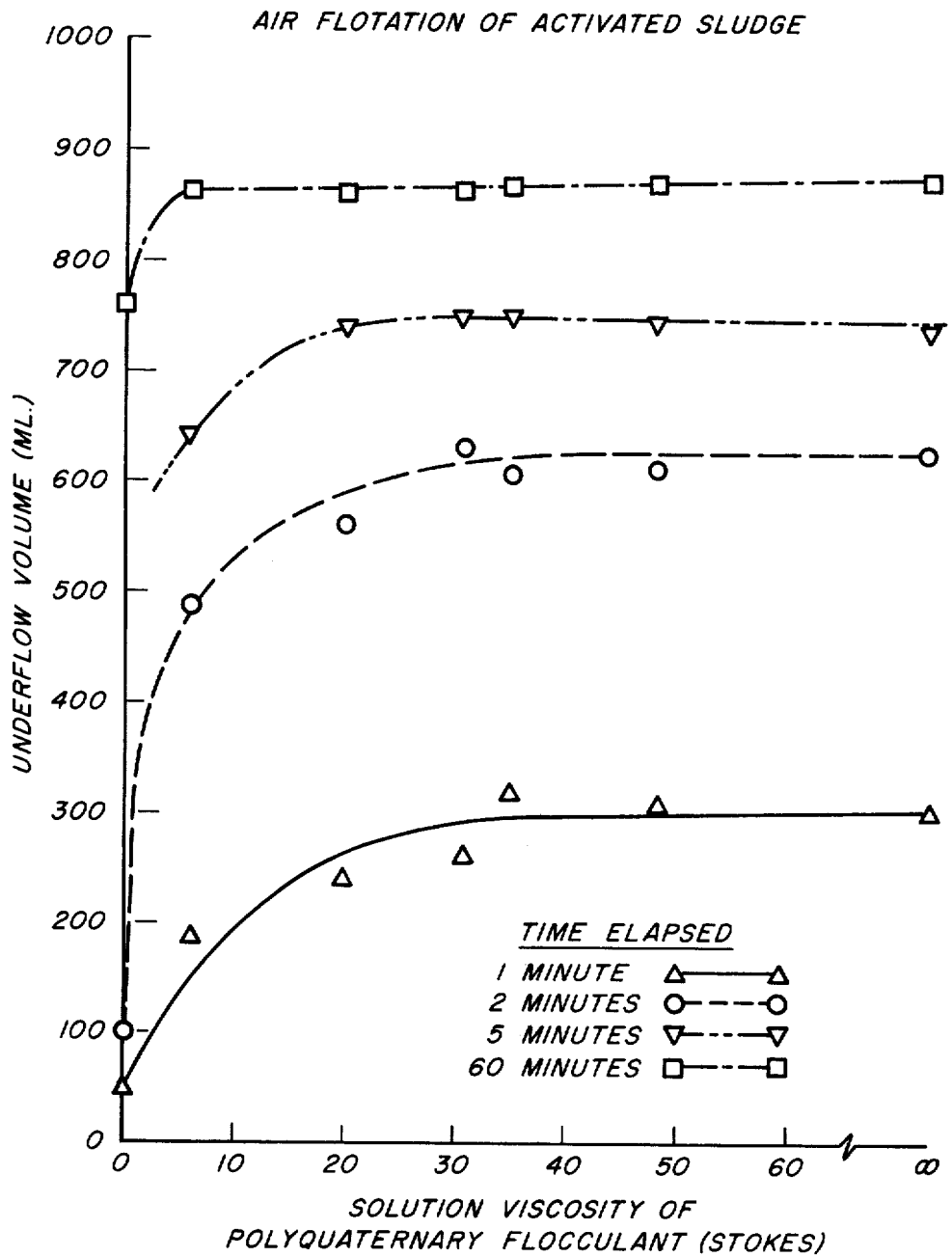
FIG. 1 shows a series of curves obtained by plotting underflow volumes as a function of polyquaternary polymer solution viscosity at various times of measurement.

The invention is more fully illustrated by the examples which follow, wherein all parts and percentages are by weight unless otherwise specifically designated.

The polyquaternary compounds used in the examples were prepared by the following procedure with variations at the termination of the reaction to provide the specific values of solution viscosity indicated by specific polyquaternary compounds.

POLYQUATERNARY PREPARATION

To a flask equipped with condenser, mechanical stirrer, thermometer, addition funnel, and pH electrodes were added 76.28 grams of deionized water and 92.53 grams of epichlorohydrin (1 mole) to give an emulsion on stirring. To the addition funnel were added 107.09 grams of 40% aqueous dimethylamine (42.84 grams real, 0.95 mole) and 3.0 grams of ethylenediamine. The amine solution was added to the epichlorohydrin emulsion over one hour, keeping the temperature between 20°C. and 31°C. After 30 minutes, the clear solution which resulted was heated to 50°C. for 1.5 hours.

The solution was then heated to 90°C. and 20 milliliters of 50% potassium carbonate (aqueous) solution were added. The viscosity of the solution was increased by incremental additions of epichlorohydrin. Initially, 5 milliliters of epichlorohydrin were added, followed by 2 ml. after 20 minutes, 1.5 ml. after an additional 15 minutes, 1.0 ml. after another 18 minutes, and finally 0.5 ml. after another 27 minutes. The product had a viscosity of 1000 centistokes at a concentration of 37%, by weight, based on the cationic portion of the polyquaternary compound, at 25°C.

In a similar manner but by variations in the amounts of incremental additions of epichlorohydrin products of the various solution viscosities employed in the examples which follow were obtained.

EXAMPLE 1

This example illustrates the advantages of products of the present invention in sludge dewatering.

In a standard sewage treatment plant operating at a flow rate of 205 gallons per minute, sludges containing a mixture of primary digested and waste activated solids were treated in separate runs with no additive and with various amounts of a polyquaternary of the present invention prepared in accordance with the procedure described above so as to have a solution viscosity at 25°C. as a 37% solution, by weight, based on the cationic portion of the polymer, of 2000 centistokes. Results are as follows:

| SUSPENDED SOLIDS IN SLUDGE (%) | FLOCCULANT ADDED (1) | SOLIDS IN EFFLUENT (%) | SOLIDS CAPTURED (%) |
|---|---|---|---|
| 7.59 | 0 | 3.13 | 59 |
| 6.18 | 4.0 | 1.22 | 80 |
| 6.16 | 11.3 | 0.38 | 95 |
| 506 | 28 | 0.08 | 98 |

(1) Pounds of 37% polymer as described per ton of sludge on a dry solids basis.

The results indicate the high increase in solids captured in a horizontal bowl centrifuge by use of the product of the present invention.

EXAMPLE 2

A laboratory procedure for evaluating air flotation of sludges was employed. A tank containing water under an air pressure of 40 pounds is prepared. Into a graduated cylinder are placed 500 mls. of the sludge to be treated. The polyquaternary compound, in the amount to be evaluated, is placed in the cylinder and mixed well in the sludge. Water from the pressure tank is then introduced into the cylinder below the sludge level until the height of the sludge and added water is at the 1 liter mark. A stop watch is immediately started to indicate elapsed time. A line of demarcation will quickly form between the clarified liquid at the bottom of the cylinder and sludge layer at the top. The graduate readings corresponding to the interface of the clarified liquor and sludge layer are taken at various time intervals to indicate the rate of rise of the sludge layer.

Using the above procedure, a series of polyquaternary compounds of varying solution viscosities at 25°C. as 37% solids, by weight, based on the weight of the cationic portion of the polyquaternary compound, were evaluated in air flotation at a dosage level of 20 parts of 37% polymer as defined per million parts of sludge. The volume of clarified liquor (underflow volume) was measured at various time intervals for the various flocculants evaluated.

The various results were plotted and are shown in FIG. 1. Underflow volumes as a function of solution viscosities of the various polyquaternary compounds are shown as curves representing the times of measurement. It can be seen that a polyquaternary compound of solution viscosity of about 800 or more is necessary to achieve the high levels of underflow volume desired, that underflow volumes tend to level off at increasing solution viscosities of the polyquaternary compounds, and that underflow volume increases with elapsed time. The high increases in underflow volume at short elapsed time intervals is readily apparent.

EXAMPLE 3

The effect of polyquaternary compounds on the volume of activated sludge produced in the municipal treatment plant at Greenwich, Conn. was evaluated. Again, a series of polymers of varying molecular weight were employed at 20 parts of 37% polymer as defined per million parts of sludge in separate runs. The volume of sludge was measured at various time intervals up to 30 minutes.

Figure 2:
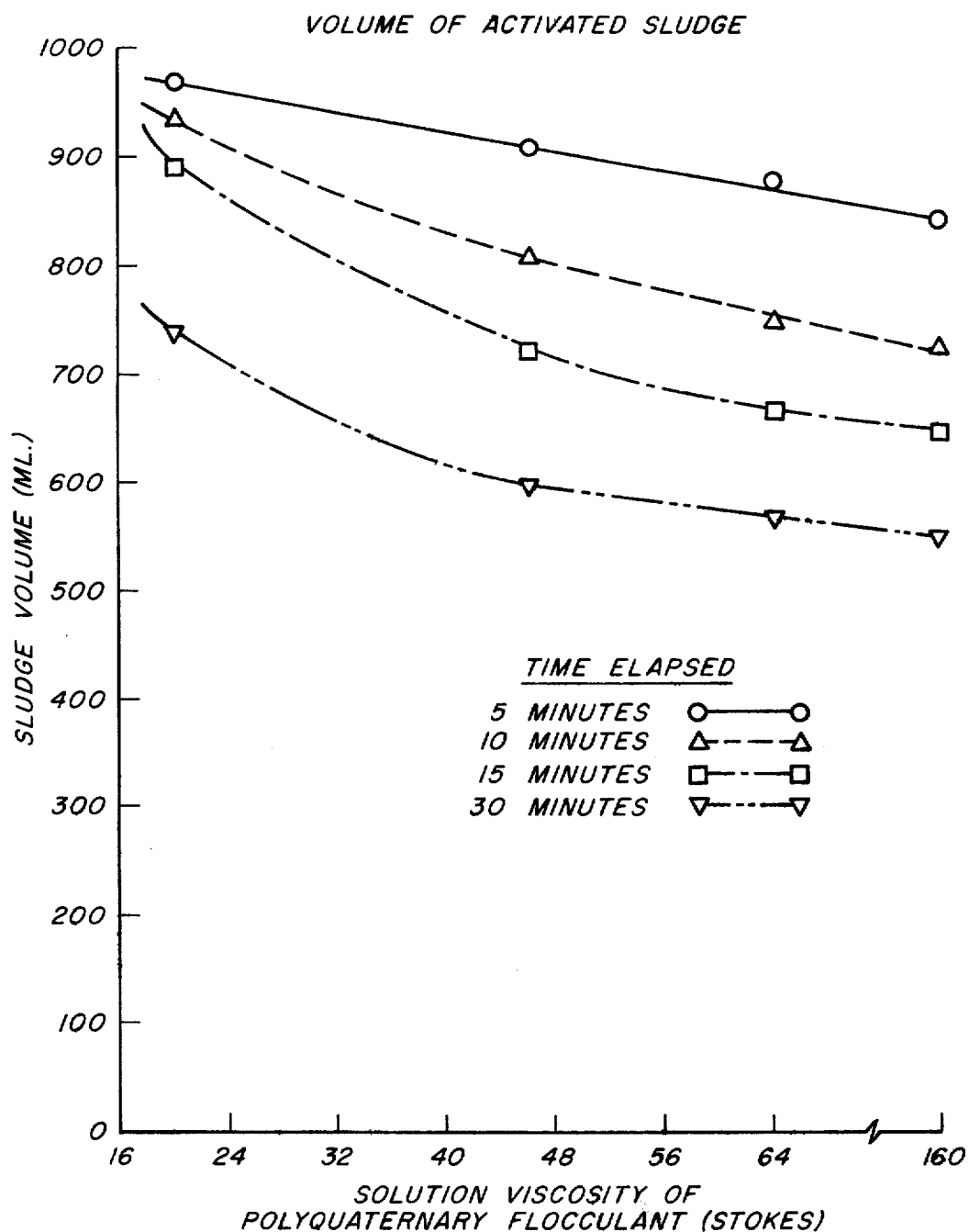
FIG. 2 shows a series of curves obtained by plotting sludge volume as a function of solution viscosities of polyquaternary polymers at various times of measurement.

The results obtained are shown in FIG. 2, wherein sludge volumes as a function of solution viscosities of the polyquaternary compounds are shown as curves representing the times of measurement. Reduction in sludge volume from 1000 milliliters is evidence of dewatering of the sludge. It can be seen that high solution viscosity of the polyquaternary compound is necessary to achieve dewatering, that increased dewatering is shown up to solution viscosities of about 17000 centistokes and that dewatering increases with elapsed time.

EXAMPLE 4

In this example, a digested sludge obtained in the municipal sewage treatment plant was employed. The effect of polyquaternary flocculant on filtration of the digested sludge was studied. Preliminary studies indicated that optimum effectiveness of the polyquaternary compounds was obtained at a usage level of 0.1 grams of real polymer solids per 150 ml. of digested sludge. At this level of usage, the volume of filtrate obtained from a 150 ml. sample of the digested sludge treated with polymer was measured after one minute of filtration. The results obtained with three polymeric flocculants of the solution viscosities indicated are as follows:

| SOLUTION VISCOSITY | MILLILITERS FILTRATE |
|---|---|
| 4600 | 110 |
| 4800 | 119 |
| 16000 | 130 |

The results indicate the high solution viscosities of the polyquaternary compounds necessary to achieve highly effective filtration. It is to be noted that in the absence of treatment with polyquaternary flocculant essentially no filtrate was obtained in one minute of filtration.

We claim:

1. A method of treating sewage sludge which comprises adding to said sludge an effective amount of a water-dispersible polyquaternary polymer comprising the reaction product of dimethylamine, a polyfunctional amine, and a difunctional epoxy compound selected from the group consisting of epihalohydrins and precursors for epihalohydrins which under alkaline conditions are readily converted into the corresponding epoxy compounds, and mixtures thereof, said polyquaternary polymer containing repeating units of the structures

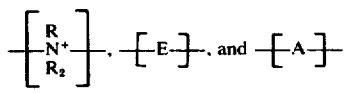

as the cationic portion, and $X^-$ as the anionic portion wherein R and $R_2$ are each methyl; E is a residue obtained from said epoxy compounds; A is a residue obtained after at least bifunctional epoxy reaction from a polyfunctional amine selected from the group consisting of ethylenediamine and polyethylenepolyamines of the structure

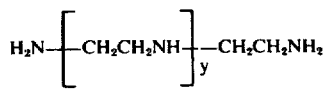

wherein $y$ represents an integer of about 1 to 5; $X^-$ is an anion forming the anionic portion of said polyquaternary compound; the amount of said polyfunctional amine being up to about 15 mole percent of the total moles of said dimethylamine and said polyfunctional amine, the amount of said E being from at least that amount which is equimolar to the molar quantities of said amines up to the full functional equivalency of said amines, so as to provide a polyquaternary compound which as a 37% aqueous solution based on the cationic portion of said polyquaternary compound has a viscosity at 25°C. of at least 800 centistokes; and the amount of said anion present is such as to satisfy anionic requirements of the cationic portion of said polyquaternary compound, and thereafter removing water from said sludge.

2. The process of claim 1 wherein said solution viscosity is in the range of from 800 to 17,000 centistokes.

3. The process of claim 1 wherein, the sludge treated is a waste activated sludge.

4. The process of claim 1 wherein the sludge being treated is subjected to gas flotation.

5. The process of claim 1 wherein said sludge is subjected to filtration subsequent to treating.

6. The process of claim 1 wherein the sludge treated is a digested sludge.

7. The procoess of claim 6 wherein the digested sludge is subjected to filtration subsequent to treating.

* * * * *